United States Patent
Mickle et al.

(10) Patent No.: US 8,461,993 B2
(45) Date of Patent: Jun. 11, 2013

(54) WIRELESS SYSTEMS HAVING MULTIPLE ELECTRONIC DEVICES AND EMPLOYING SIMPLIFIED FABRICATION AND MATCHING, AND ASSOCIATED METHODS

(75) Inventors: Marlin H. Mickle, Pittsburgh, PA (US); Leonid Mats, Pittsburgh, PA (US); Justin M. Panuski, Alexandria, VA (US)

(73) Assignee: University of Pittsburgh-Of the Commonwealth System of Higher Education, Pittsburgh, PA (US)

( * ) Notice: Subject to any disclaimer, the term of this patent is extended or adjusted under 35 U.S.C. 154(b) by 1294 days.

(21) Appl. No.: 12/181,753

(22) Filed: Jul. 29, 2008

(65) Prior Publication Data
US 2009/0033465 A1 Feb. 5, 2009

Related U.S. Application Data

(60) Provisional application No. 60/953,509, filed on Aug. 2, 2007.

(51) Int. Cl.
*G08B 13/14* (2006.01)
*H04Q 5/22* (2006.01)
*H01Q 21/00* (2006.01)
*H01Q 1/36* (2006.01)
*H01Q 9/28* (2006.01)

(52) U.S. Cl.
USPC ............... 340/572.1; 340/572.7; 340/10.1; 343/893; 343/895; 343/795

(58) Field of Classification Search
USPC ............................................... 340/10.33
See application file for complete search history.

(56) References Cited

U.S. PATENT DOCUMENTS

| | | | | |
|---|---|---|---|---|
| 4,364,043 A | * | 12/1982 | Cole et al. | 340/10.34 |
| 5,604,485 A | * | 2/1997 | Lauro et al. | 340/572.5 |
| 6,724,308 B2 | * | 4/2004 | Nicholson | 340/572.1 |
| 7,218,230 B2 | * | 5/2007 | Wu et al. | 340/572.1 |
| 7,414,583 B2 | * | 8/2008 | Choi et al. | 343/700 MS |
| 7,671,718 B2 | * | 3/2010 | Turner et al. | 340/5.61 |
| 7,714,794 B2 | * | 5/2010 | Tavassoli Hozouri | 343/795 |
| 8,120,461 B2 | * | 2/2012 | Zimmerman et al. | 340/10.1 |
| 2005/0275591 A1 | * | 12/2005 | King et al. | 343/700 MS |
| 2006/0063568 A1 | | 3/2006 | Mickle et al. | |
| 2007/0026568 A1 | | 2/2007 | Beyne | |
| 2007/0080867 A1 | | 4/2007 | Son et al. | |
| 2007/0109121 A1 | | 5/2007 | Cohen | |
| 2007/0164868 A1 | | 7/2007 | Deavours et al. | |

* cited by examiner

*Primary Examiner* — Jennifer Mehmood
*Assistant Examiner* — John Mortell
(74) *Attorney, Agent, or Firm* — Eckert Seamans Cherin & Mellott, LLC; Phillip E. Levy

(57) ABSTRACT

A means and method to connect multiple IC chips to a single apparatus where the IC chips may function as a passive system or network in space. The collection of antennae and coupled near field devices form a pool of energy in which multiple devices may be introduced so as to provide a pool of energy and/or to function as a network or networks of devices including IC chips.

22 Claims, 15 Drawing Sheets

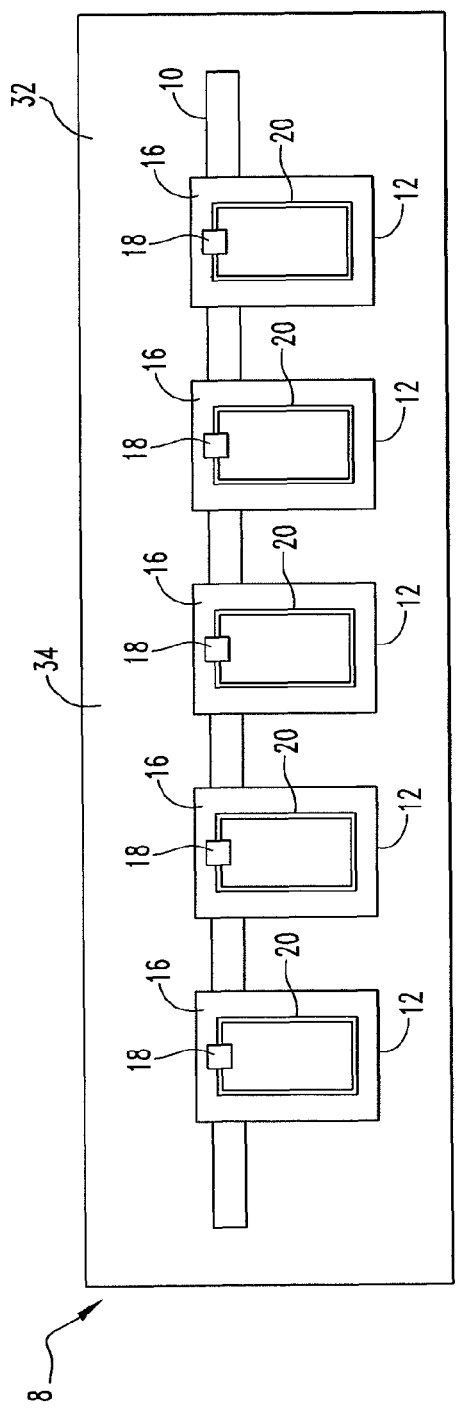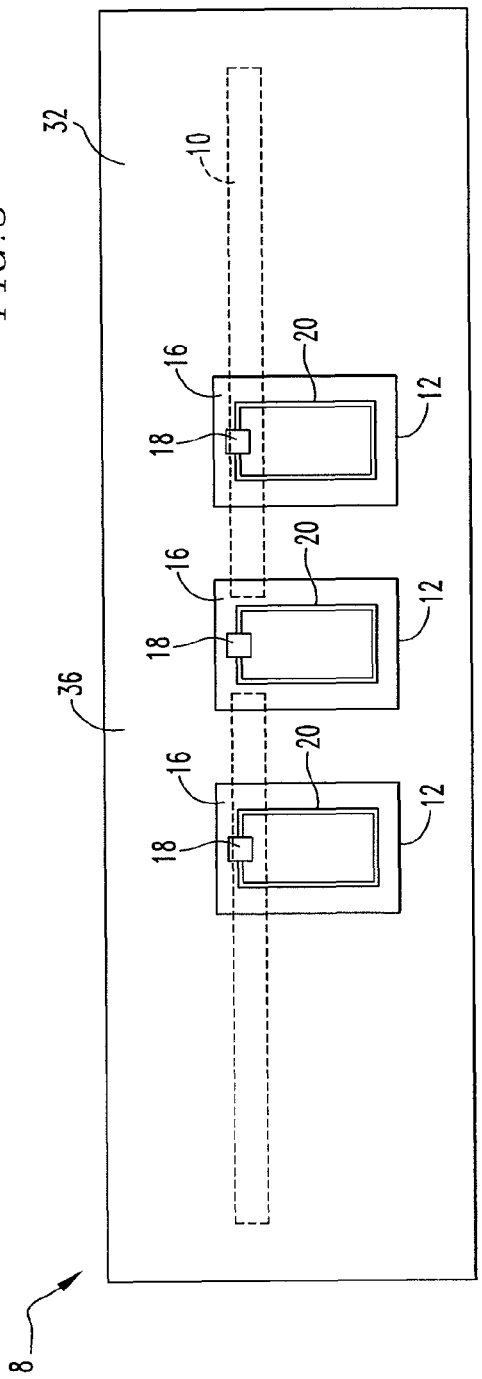

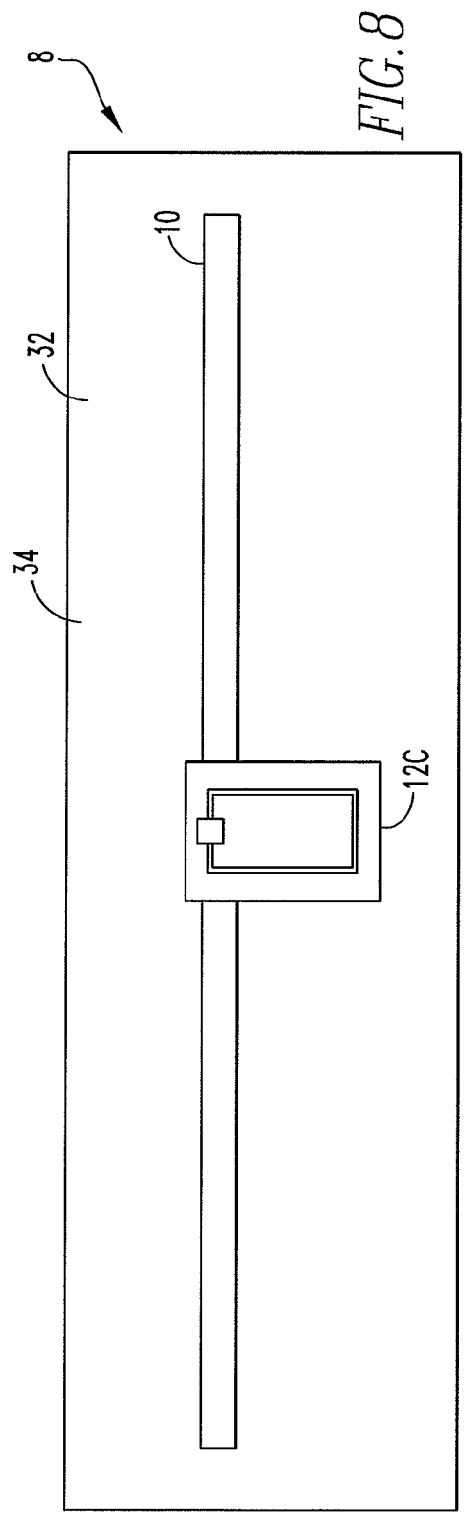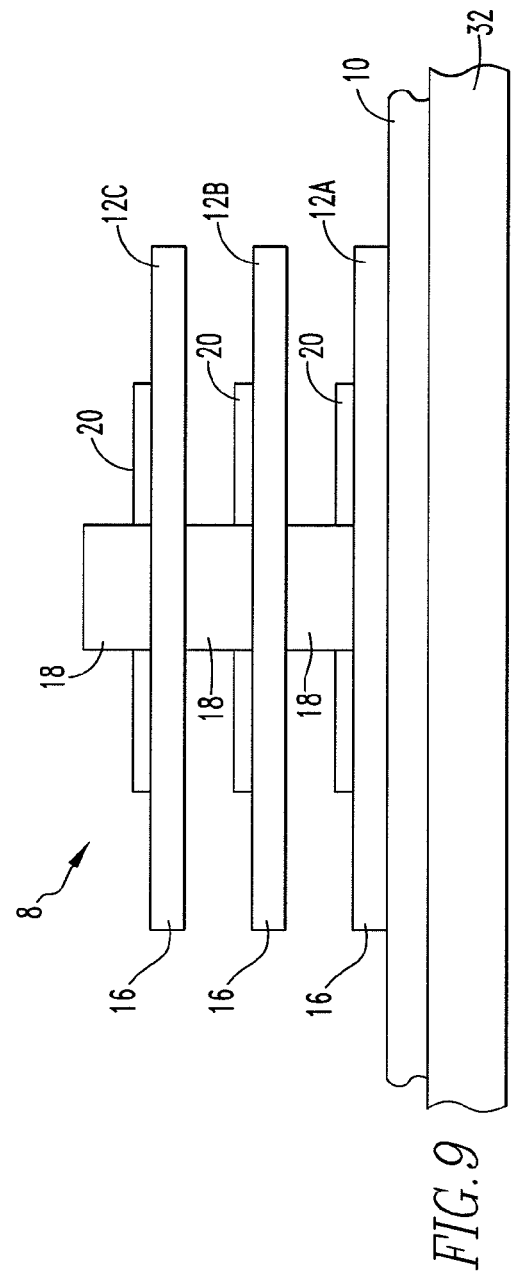

WIRELESS SYSTEMS HAVING MULTIPLE ELECTRONIC DEVICES AND EMPLOYING SIMPLIFIED FABRICATION AND MATCHING, AND ASSOCIATED METHODS

CROSS-REFERENCE TO RELATED APPLICATIONS

This application claims the benefit of U.S. Provisional Application No. 60/953,509, entitled "RFID Chip and Antenna Concepts," which was filed on Aug. 2, 2007, the disclosure of which are incorporated herein by reference.

FIELD OF THE INVENTION

The present invention relates wireless systems that employ multiple wireless electronic devices or components, and in particular to techniques for simplifying fabrication and matching in cases where multiple electronic devices are to be connected to one or more antennas in a wireless system.

BACKGROUND OF THE INVENTION

It is well known that wireless devices, such as radio frequency identification (RFID) tags or similar transponder devices, can be powered remotely by radio frequency (RF) energy. In particular, such devices may be powered by receiving RF energy that is either directed toward them (a directed source) or is ambient and converting the received RF energy into a direct current (DC) voltage. The DC voltage may then be used to power on-board electronics, such as a microprocessor, sensing circuitry, and/or an RF transmitter, or to charge a power storage device such as a rechargeable battery or a supercapacitor. Such devices are employed in a number of fields, such as RFID systems, security monitoring and remote sensing, among others. Furthermore, for many reasons, multiple wireless devices as described above often need to be connected to a single antenna. For example, this may be desirable to enable flexibility with a common form factor.

SUMMARY OF THE INVENTION

In one embodiment, a wireless system is provided that includes a base station at a first location which transmits far field RF energy, and a local subsystem at a second location separate from the first location. The local subsystem includes a parent antenna and a plurality of near field devices. The parent antenna receives the far field RF energy and generates a near field in response thereto. In addition, each of the near field devices includes an IC chip operatively coupled to a near field conductor, such as a looped conductor, wherein the IC chip of each of the near field devices is wirelessly coupled to the near field through the near field conductor thereof. Also, the IC chip and the near field conductor of each of the near field devices is not directly physically connected to the parent antenna. In operation, the received far field RF energy induces a current in the parent antenna, and the parent antenna generates the near field in response to the current. The IC chip of each of the near field devices receives AC energy from the near field through the near field conductor of the near field device and, in one particular embodiment, converts the AC energy into a DC voltage. The near field devices may be selectively positioned relative to the parent antenna such that a total amount of DC energy generated by the near field devices is at a maximum. The IC chip of each of the near field devices is wirelessly coupled to the near field through inductive and/or capacitive coupling between the parent antenna and the near field conductor thereof. The IC chip of each of the near field devices may receive power and communications from the base station through the wireless coupling to the near field.

In one particular embodiment, the local subsystem includes a substrate and the near field devices are provided on and distributed along the substrate. The parent antenna may be provided on a first surface of the substrate, and the near field devices may provided on and distributed along the first surface. Alternatively, the parent antenna may be provided on a first surface of the substrate and the near field devices may provided on and distributed along both the first surface of the substrate and a second surface of the substrate opposite the first surface. As a further alternative, the local subsystem may include a substrate, and the near field devices mat be stacked on top of one another and provided on a first surface of the substrate. The parent antenna in this embodiment may be provided on the first surface of the substrate. In yet another embodiment, the local subsystem includes a substrate, a first one or more of the near field devices are stacked on top of one another and provided on a first surface of the substrate, a second one or more of the near field devices are stacked on top of one another and provided on a second surface of the substrate, and the parent antenna is provided on the first surface of the substrate opposite the first surface. In still another embodiment, the local subsystem includes a substrate, a first one or more of the near field devices are stacked on top of one another and provided on a first surface of the substrate, and a second one or more of the near field devices are provided on and distributed along a second surface of the substrate opposite the first surface.

In yet another particular embodiment, the IC chip of each near field device is nether directly above nor directly below the IC chip of another one of the near field devices. In an alternative embodiment, the near field devices include a first near field device and a second near field device stacked on top of the first near field device, wherein the second near field device is able to fit entirely within a boundary defined by the near field conductor and the IC chip of the first near field device. Alternatively, the near field devices may each be shifted linearly with respect to one another such that the IC chip of each near field device is positioned adjacent to the IC chip of one another one of the near field devices.

A wireless transmission method is also provided that includes steps of transmitting far field RF energy from a first location, receiving the far field RF energy at a second location separate from the first location and generating a near field in response thereto, wirelessly coupling to the near field, and receiving AC energy from the near field in response to the wirelessly coupling.

In a further embodiment, a transponder apparatus is provided that includes a main antenna element having a plurality of conductor elements, with each of the conductor elements being direct connection coupled to one another, and a plurality of devices, wherein each of the devices includes an IC chip operatively coupled to a conductor, such as a looped conductor, wherein each of the devices is positioned adjacent to a terminal end of a respective one of the conductor elements, wherein the conductor of each of the devices is capacitively coupled to the one of the conductor elements adjacent to which the device is positioned, wherein the conductor and the IC chip of each of the devices is not physically connected to the one of the conductor elements adjacent to which the device is positioned, and wherein each of the conductor elements has a slot provided therein which provides an inductive reactance.

In still a further embodiment, a transponder apparatus is provided that includes a plurality of separate antenna elements, and a plurality of devices, wherein each of the devices includes an IC chip operatively coupled to a conductor, such as a looped conductor, wherein each of the devices is positioned adjacent to a terminal end of a respective one of the antenna elements, wherein the conductor of each of the devices is capacitively coupled to the one of the antenna elements adjacent to which the device is positioned, wherein the conductor and the IC chip of each of the devices is not physically connected to the one of the antenna elements adjacent to which the device is positioned, and wherein each of the conductor elements has a slot provided therein which provides an inductive reactance.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 5 is a top plan view and FIG. 6 is a bottom plan view of a local subsystem employed in the system shown in FIG. 1 according to one particular embodiment;

FIG. 8 is a top plan view and FIG. 9 is a partial front elevational view of a local subsystem employed in the system shown in FIG. 1 according to yet another particular embodiment;

DESCRIPTION OF THE PREFERRED EMBODIMENTS

Figure 1:
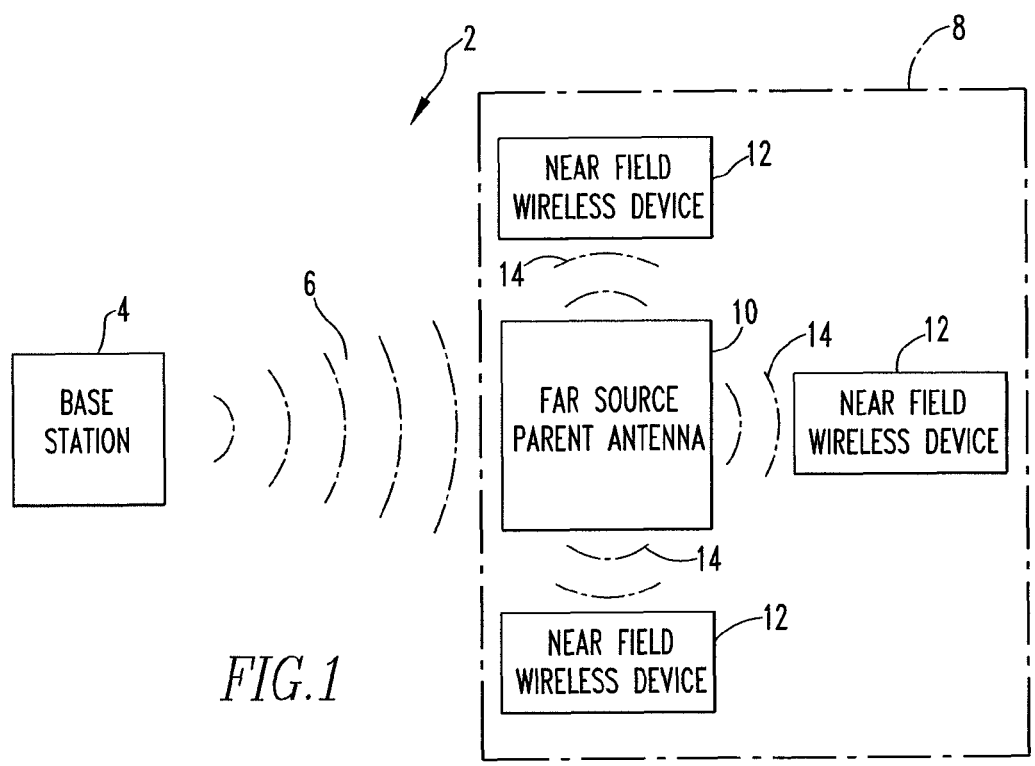
FIG. 1 is a schematic diagram of a system for providing power to and/or communicating with wireless devices using a near field technique according to one embodiment of the present invention.

FIG. 1 is a schematic diagram of a system 2 for providing power to and/or communicating with wireless devices using a near field technique, such as near-field inductive coupling, near-field capacitive coupling, or a combination thereof, while in the far field of a directed or ambient energy source according to one embodiment of the present invention. The definition of the near-field is generally accepted as a region that is in proximity to an antenna or another radiating structure where the electric and magnetic fields do not have a plane-wave characteristic but vary greatly from one point to another. Furthermore, the near-field can be subdivided into two regions which are named the reactive near field and the radiating near field. The reactive near-field is closest to the radiating antenna and contains almost all of the stored energy, whereas the radiating near-field is where the radiation field is dominant over the reactive field but does not possess plane-wave characteristics and is complicated in structure. This is in contrast to the far-field, which is generally defined as the region where the electromagnetic field has a plane-wave characteristic, i.e., it has a uniform distribution of the electric and magnetic field strength in planes transverse to the direction of propagation. As used herein, the terms near-field and far-field shall have the meaning provided above. In addition, as used herein, inductive coupling shall mean the transfer of a signal or energy from one circuit component to another through a shared magnetic field, and capacitive coupling shall mean the transfer of a signal or energy from one circuit component to another due to discrete or parasitic capacitance between the circuit components.

As seen in FIG. 1, the system 2 includes a base station 4 which acts as a far field (directed or ambient) source by generating and transmitting RF energy 6. The system 2 further includes a local subsystem 8 which itself includes a far source parent antenna 10 and a plurality of near field wireless devices 12, sometimes referred to as satellites, described in greater detail elsewhere herein. The far source parent antenna 10 may be any suitable antenna form, such as, without limitation, a dipole, a patch or a serpentine. In operation, when the far source parent antenna 10 receives the RF energy 6, the received RF energy 6 induces a current in the far source parent antenna 10. The current flowing through the far source parent antenna 10 causes a near field 14 (shown by the flux lines in FIG. 1) to be generated in the vicinity of the far source parent antenna 10. In other words, the base station 4 (the far field source) creates a near field 14 in the vicinity of the far source parent antenna 10. As described in greater detail herein, the near field wireless devices 12 receive power and/or communicate with the base station 4 by wirelessly coupling to the near field 14 using, for example, near-field inductive coupling, near-field capacitive coupling, or a combination thereof.

Figure 2:
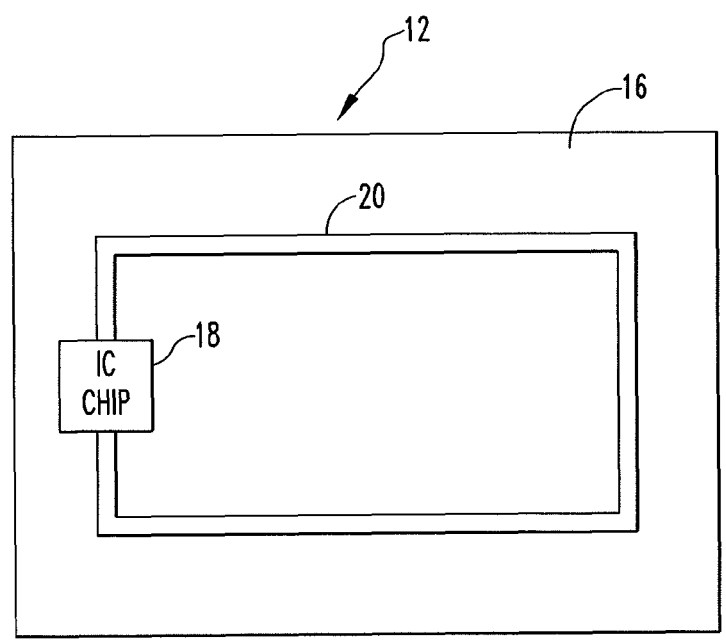
FIG. 2 is a schematic diagram of one non-limiting embodiment of a near field wireless device that may be employed in the system shown in FIG. 1.

FIG. 2 is a schematic diagram of one non-limiting embodiment of the near field wireless device 12 that may be employed in the system 2 shown in FIG. 1. The near field wireless device 12 in this particular embodiment includes a substrate 16 made of a non-conductive material such as, without limitation, plastic, on which is provided an IC chip 18, which may be, without limitation, an RFID chip. In addition, a tuned loop conductor 20 is operatively coupled to the IC chip 18. In particular, the tuned loop conductor 20 is preferably directly connected to two or more connecting pads (not shown) provided as part of the IC chip 18 so as to be in electrical connection with the internal components of the IC chip 18 as described elsewhere herein. The tuned loop conductor 20 is preferably tuned to the frequency of the near field 14 that is generated by the far source parent antenna 10 in the local subsystem 8.

In the embodiment shown in FIG. 2, the tuned looped conductor 20 has a rectangular shape. It should be understood that this is meant to be exemplary, and that other shapes, such as a triangle, a circle or a tetrahedron are also possible. In fact, if a triangular or tetrahedral shape is employed, a plurality of near field devices 12 could be physically connected to one another to form a three-dimensional shape, such as a sphere, where each vertex thereof will include a tuned loop conductor 20. Also, it should be understood that in the embodiments described herein, the use of a looped conductor is not meant to be limiting, and that other conductor configurations suitable for making the required coupling may also be employed.

Figure 3:
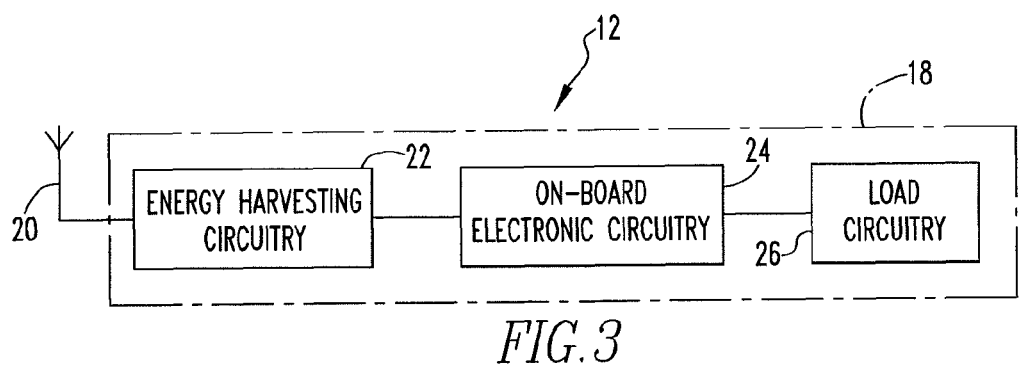
FIG. 3 is a block diagram of the near field wireless device of FIG. 2 according to one particular embodiment.

FIG. 3 is a block diagram of the near field wireless device 12 showing the components of the IC chip 18 according to one particular embodiment. The near field wireless device 12 includes energy harvesting circuitry 22 that is operatively coupled to on-board electronic circuitry 24, which in turn is operatively coupled to load circuitry 26 which could include a transmitter. In operation, the energy harvesting circuitry 22 is structured to receive the AC energy of the near field 14 and, as described in greater detail below, harvest energy therefrom by converting the received AC energy into DC energy, e.g., a DC voltage. The DC voltage is then used to power the on-board electronic circuitry 24 and the load circuitry 26. The on-board electronic circuitry 24 may include, for example, a processing unit, such as, without limitation, a microprocessor, a microcontroller or a PIC processor, additional logic circuitry, and a sensing circuit for sensing or measuring a particular parameter (such as temperature, in which case a thermistor may be included in the sensing circuit). The load circuitry 26 in the present embodiment may be structured to transmit an RF information signal to a receiving device, such as the base station 4. The RF information signal may, for example, include data that identifies the near field wireless device 12 and/or data that is sensed by a component provided as part of the on-board electronic circuitry 24. For instance, the load circuitry 26 functioning as a transmitter may transmit an RF signal that represents a temperature as measured by a thermistor provided as part of the on-board electronic circuitry 24. In addition, the on-board electronic circuitry 24 may further include an energy storage device, such as a rechargeable battery or a capacitor (such as a supercapacitor) for storing energy from the DC voltage, which energy is then used to power the components of the on-board electronic circuitry 24.

Figure 4:
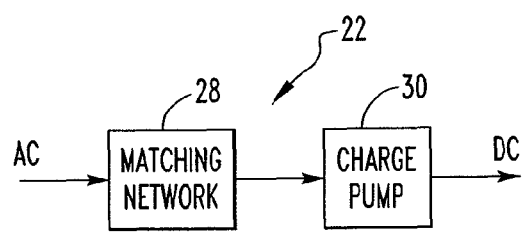
FIG. 4 is a block diagram of one particular, non-limiting embodiment of the energy harvesting circuitry that may be employed in the near field wireless device of FIG. 2.

FIG. 4 is a block diagram of one particular, non-limiting embodiment of the energy harvesting circuitry 22 that may be employed in the near field wireless device 12. As seen in FIG. 4, this embodiment of the energy harvesting circuitry 22 includes a matching network 28 which is electrically connected to the tuned loop conductor 20. The matching network 28 is electrically connected to a voltage boosting and rectifying circuit preferably in the form of a one or more stage charge pump 30. Charge pumps are well known in the art. Basically, one stage of a charge pump significantly increases the effective amplitude of an AC input voltage with the resulting increased DC voltage appearing on an output capacitor. The voltage could also be stored using a rechargeable battery. Successive stages of a charge pump, if present, will essentially increase the voltage from the previous stage resulting in an increased output voltage. In operation, the tuned loop conductor 20 receives the AC energy of the near field 14 and provides that energy to the charge pump 30 through the matching network 28. The charge pump 30 rectifies the received AC signal to produce a DC signal that is amplified as compared to what it would have been had a simple rectifier been used. In one particular embodiment, the matching network 28 is chosen (i.e., its impedance is chosen) so as to maximize the voltage of the DC signal output by charge pump 30. In other words, the matching network 28 matches the impedance of the tuned loop conductor 20 to the charge pump 30 solely on the basis of maximizing the DC output of the charge pump 30. In the preferred embodiment, the matching network 28 is an LC circuit of either an L topology (which includes one inductor and one capacitor) or a π topology (which includes one inductor and two capacitors) wherein the inductance of the LC circuit and the capacitance of the LC circuit are chosen so as to maximize the DC output of the charge pump 30. Furthermore, the matching network 28 may be chosen so as to maximize the output of the charge pump 30 using a trial and error ("annealing") empirical approach in which various sets of inductor and capacitor values are used as matching elements in the matching network 28, and the resulting output of the charge pump 30 is measured for each combination, and the combination that produces the maximum output is chosen.

FIG. 5 is a top plan view and FIG. 6 is a bottom plan view of a local subsystem 8 according to one particular embodiment. The local subsystem 8 in this embodiment includes a far source parent antenna 10 in the form of a dipole antenna provided on the top surface 34 of a non-conductive substrate 32, which may be, for example, a fiberglass material as used in printed circuit boards or any other appropriate substrate. As seen in FIGS. 5 and 6, a first plurality of near field devices 12 are provided on the top surface 34 of the substrate 32, and a second plurality of near field devices 12 are provided on the bottom surface 36 of the substrate 32. The near field devices 12 may be permanently attached to the substrate 32 using a suitable adhesive material, or alternatively, may be removeably attached to the substrate 32 using a suitable mechanism such as a clear peel-able plastic tape. In either case, due to the presence of the substrate 16, there is no contact or direct physical connection between the far source parent antenna 10 and the tuned loop conductor 20 of any of the near field devices 12. However, as described in greater detail elsewhere herein, each near field device 12 is wirelessly coupled to the near field 14 (and preferably the reactive near field portion thereof) generated by the far source parent antenna 10 as a result of inductive and/or capacitive coupling between the tuned loop conductor 20 and the near field 14. Eliminating the need for a direct physical connection between the far source parent antenna 10 and the near field devices 12 simplifies fabrication and impedance matching as such multiple physical connections would require considerable attention in manufacturing.

It should be understood that while near field devices 12 are shown on both the top surface 34 and the bottom surface 36 of the substrate 32, this is meant to be exemplary only, and that near field devices 12 may be provided on only a single surface of the substrate 32 in some embodiments. In fact, it is not necessary that the near field devices be attached to the substrate on any surface thereof, as the present invention will function as described herein as long as a near field device 12 is in the vicinity of the far source parent antenna 10 in an area where the near field 14 is strong enough for energy to be harvested therefrom as described herein.

Figure 7:
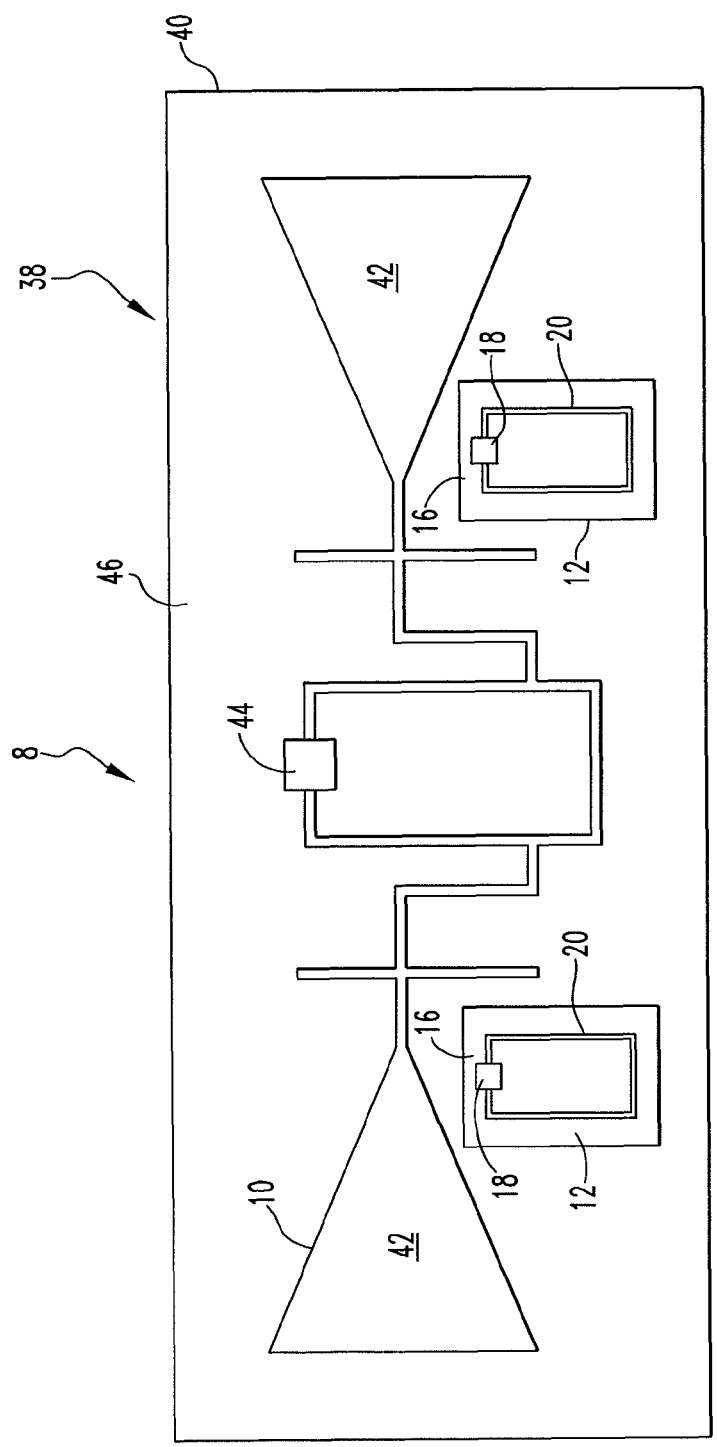
FIG. 7 is a top plan view of a local subsystem employed in the system shown in FIG. 1 according to another particular embodiment.

FIG. 7 is a top plan view of a local subsystem 8 according to another particular embodiment. In this embodiment, the local subsystem 8 includes a conventional (prior art) RFID tag 38 available from a number of commercial sources such as, without limitation Texas Instruments, Inc. The RFID tag 38 includes a substrate 40. An RFID antenna 42 is provided on the top surface 46 of the substrate 40 and serves as the far source parent antenna 10. An RFID chip 44, similar in structure and functionality to the IC chip 18, is operatively coupled to the RFID antenna 42 in a conventional manner. In addition, as seen in FIG. 7, a plurality of near field devices 12 are provided on the top surface 46 of the substrate 40 (although not shown, a second plurality of near field devices 12 may be provided on the bottom surface of the substrate 40). The near field devices 12 may be permanently attached to the substrate 40 using a suitable adhesive material, or alternatively, may be removeably attached to the substrate 40 using a suitable mechanism as described elsewhere herein. In either case, there is no contact or direct physical connection between the far source parent antenna 10 (the RFID antenna 42) and the tuned loop conductor 20 of any of the near field devices 12. However, as described elsewhere herein, each near field device 12 is wirelessly coupled to the near field 14 generated by the far source parent antenna 10 as a result of inductive and/or capacitive coupling between the tuned loop conductor 20 and the near field 14.

Figure 10:
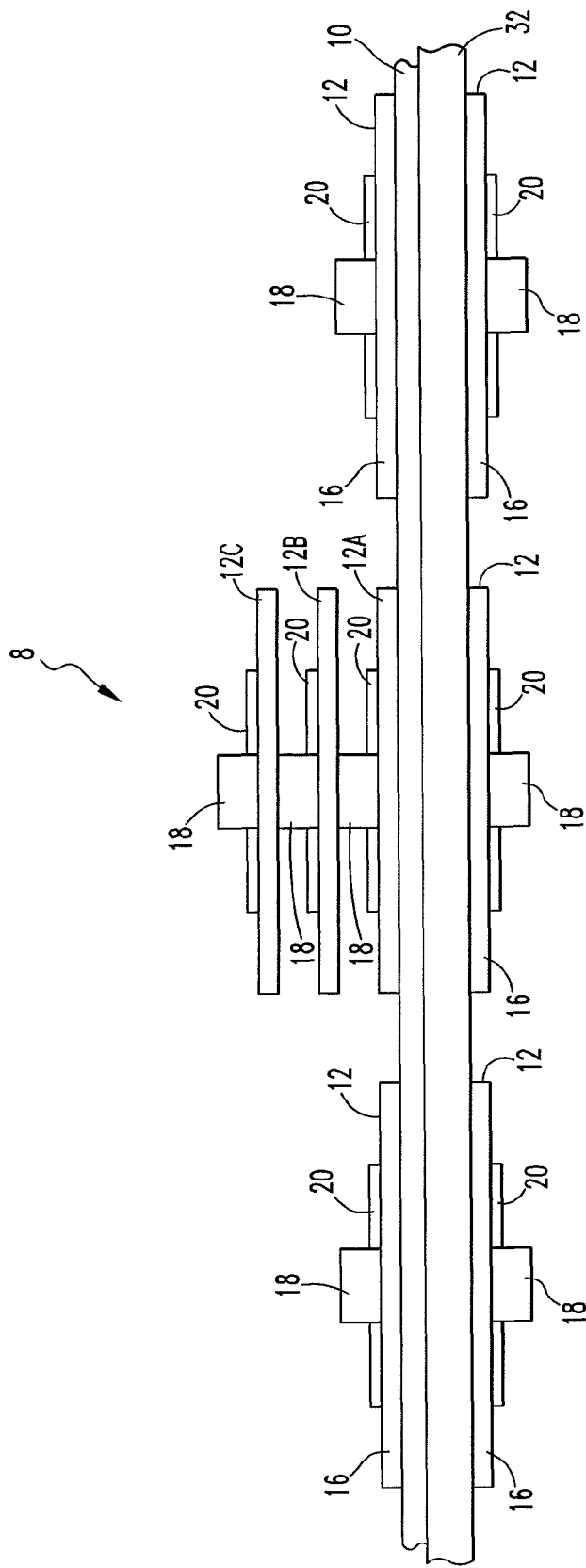
FIG. 10 is a partial front elevational view of a local subsystem employed in the system shown in FIG. 1 according to still another particular embodiment.

FIG. 8 is a top plan view and FIG. 9 is a partial front elevational view of a local subsystem 8 according to yet another particular embodiment. The local subsystem 8 in this embodiment includes a far source parent antenna 10 in the form of a dipole antenna provided on the top surface 34 of a non-conductive substrate 32. As seen in FIGS. 8 and 9, a plurality of near field devices 12, identified as 12A, 12B and 12C, are provided on the top surface 34 of the substrate 32 in a manner in which they are stacked on top of one another. Preferably, the bottom most near field device 12A is permanently or removeably attached to the substrate 32 as described elsewhere herein, the near field device 12B is stacked on top of and permanently or removeably attached to the near field device 12A, and the near field device 12C is stacked on top of and permanently or removeably attached to the near field device 12C. Due to the presence of the substrate 16 of the near field device 12A, there is no contact or direct physical connection between the far source parent antenna 10 and the tuned loop conductor 20 of any of the near field devices 12. However, as described elsewhere herein, each near field device 12A, 12B, 12C is wirelessly coupled to the near field 14 generated by the far source parent antenna 10 as a result of inductive and/or capacitive coupling between the tuned loop conductor 20 thereof and the near field 14. It should be understood that while near field devices 12 are shown on only the top surface 34, near field devices 12 may also be provided in a stacked manner on the bottom surface of the substrate 32 in some embodiments. In addition, according to one specific embodiment, a plurality of near field devices 12 in addition to the stacked near field devices 12A, 12B, 12C may also be provided on either or both surfaces of the substrate 32 in a configuration in which they are positioned adjacent to one another (rather than stacked) as shown in, for example, FIGS. 5 and 6. An example of such an embodiment is shown in FIG. 10.

In the embodiments of FIGS. 5-10, the near field devices 12 may be selectively positioned with respect to the far source parent antenna 10 (e.g., on the associated substrate 32) such that the total amount of DC energy that is harvested by the energy harvesting circuitry 22 of each of the near field devices 12 is maximized (different amounts may be harvested by each depending on position). This may be accomplished through a trial and error approach by moving the near field devices 12 around and measuring the harvested DC energy until a configuration is found wherein the total energy harvested is at a maximum.

Figure 11:
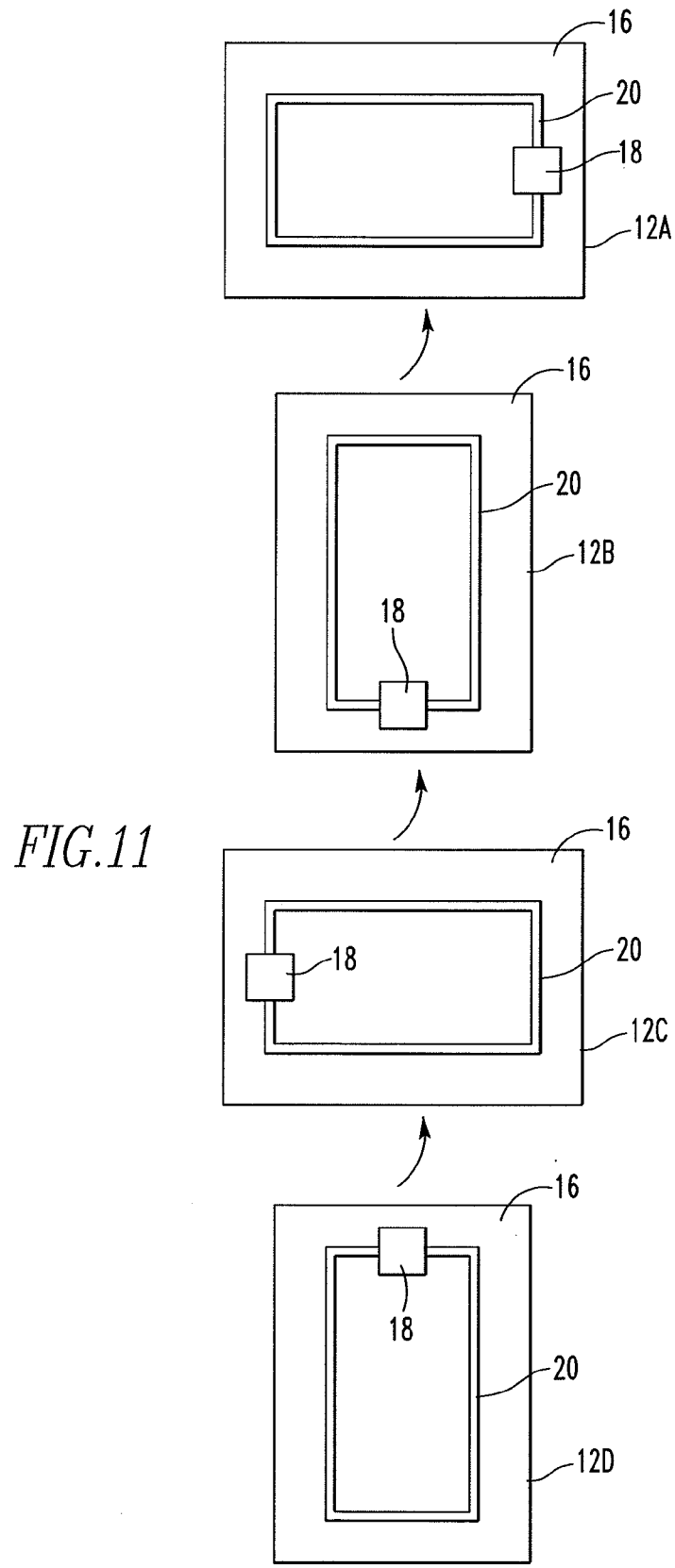
FIG. 11 is a schematic diagram illustrating the construction of a local subsystem according to one particular embodiment.

As will be appreciated, in most embodiments of the near field device 12, the thickest component will be the IC chip 18. As a result, when multiple near field devices 12 are stacked as shown in FIGS. 9 and 10 wherein the IC chips 18 are positioned directly on top of one another, the stack will have a maximum thickness. According to one particular embodiment of the local subsystem 8, this thickness may be reduced and minimized by alternating the position of the IC chips of each near field device 12 when the near field devices 12 are stacked. This reduction of thickness is facilitated by making the substrate 16 and the tuned loop conductor 20 of each near field device 12 of a flexible material such that they can bend when stacked on top of one another to take up empty space that otherwise would be present therebetween. Construction of a local subsystem 8 according to this embodiment is illustrated in FIG. 11 wherein the arrows represent one near field device 12 being stacked on top of another near field device 12.

Figure 12:
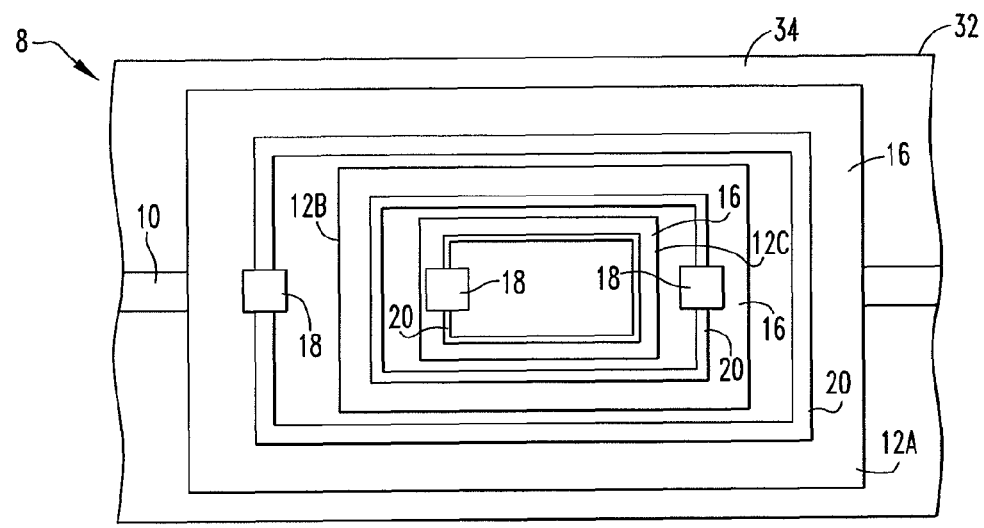
FIG. 12 is a partial top plan view and FIG. 13 is a schematic diagram which together illustrate another embodiment of a local subsystem which reduces and minimizes thickness of a stack of near field devices.
Figure 13:
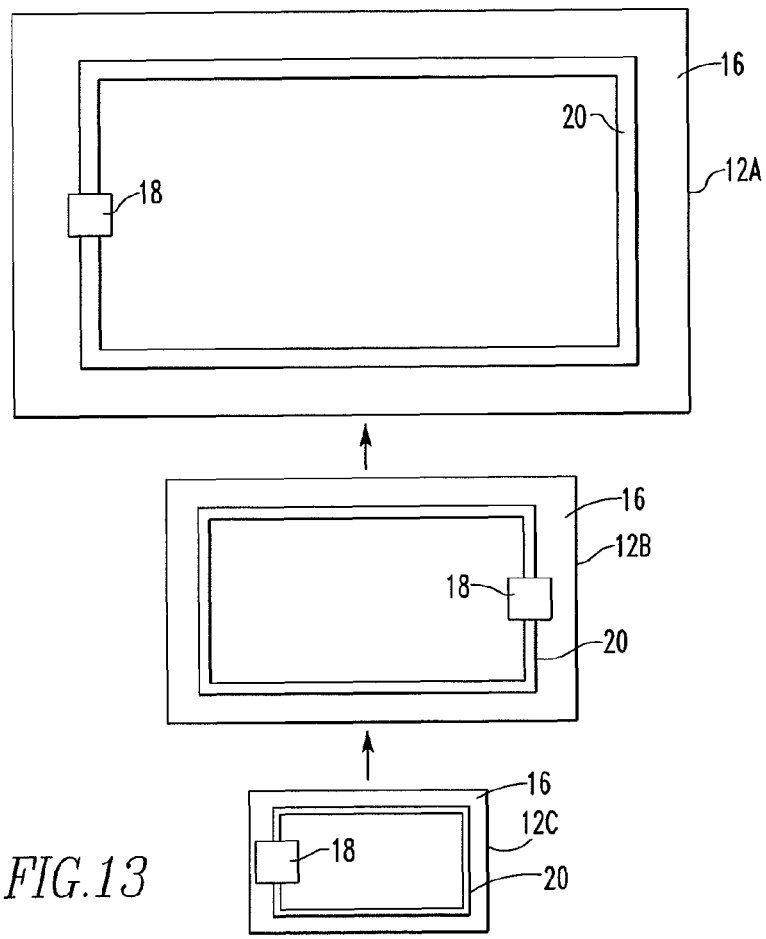
Figure 14:
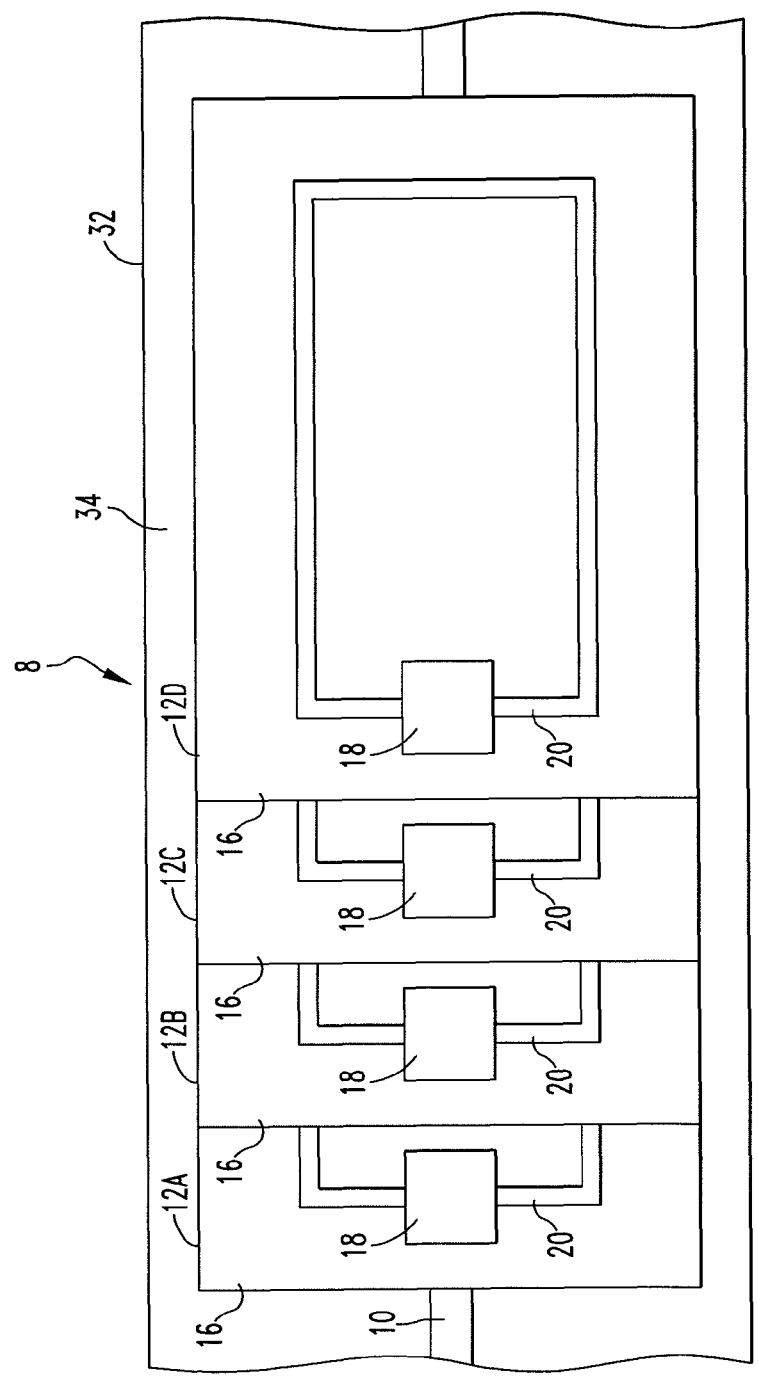
FIG. 14 is a schematic diagram which shows yet another embodiment of a local subsystem which reduces and minimizes the thickness of a stack of near field devices.

FIGS. 12 and 13 illustrate another embodiment of a local subsystem 8 which reduces and minimizes the thickness of the stack of near field devices 12. In this embodiment, the near field devices 12 are constructed such that the substrate 16 of each near field device 12 in the stack is able to fit within the interior of the near field device 12 immediately below it as bound on one end by the inner edge of the IC chip 18 thereof. More preferably, the near field devices 12 are constructed such that the substrate 16 of each near field device 12 in the stack is able to fit within the tuned loop conductor 20 of the near field device 12 immediately below it. In this configuration, the near field devices are able to be stacked like Russian dolls. FIG. 14 shows yet another embodiment of a local subsystem 8 which reduces and minimizes thickness of the stack of near field devices 12. In this embodiment, the near field devices 12A, 12B, 12C, 12D are stacked such that the near field devices 12A, 12B, 12C, 12D are each shifted linearly with respect to one another in the stack. As a result, the IC chips 18 thereof will be positioned adjacent to one another rather than directly on top of one another. Again, this reduction of thickness is facilitated by making the substrate 16 and the tuned loop conductor 20 of each near field device 12 of a flexible material such that they can bend when stacked on top of one another to take up empty space that otherwise would be present therebetween.

Figure 15:
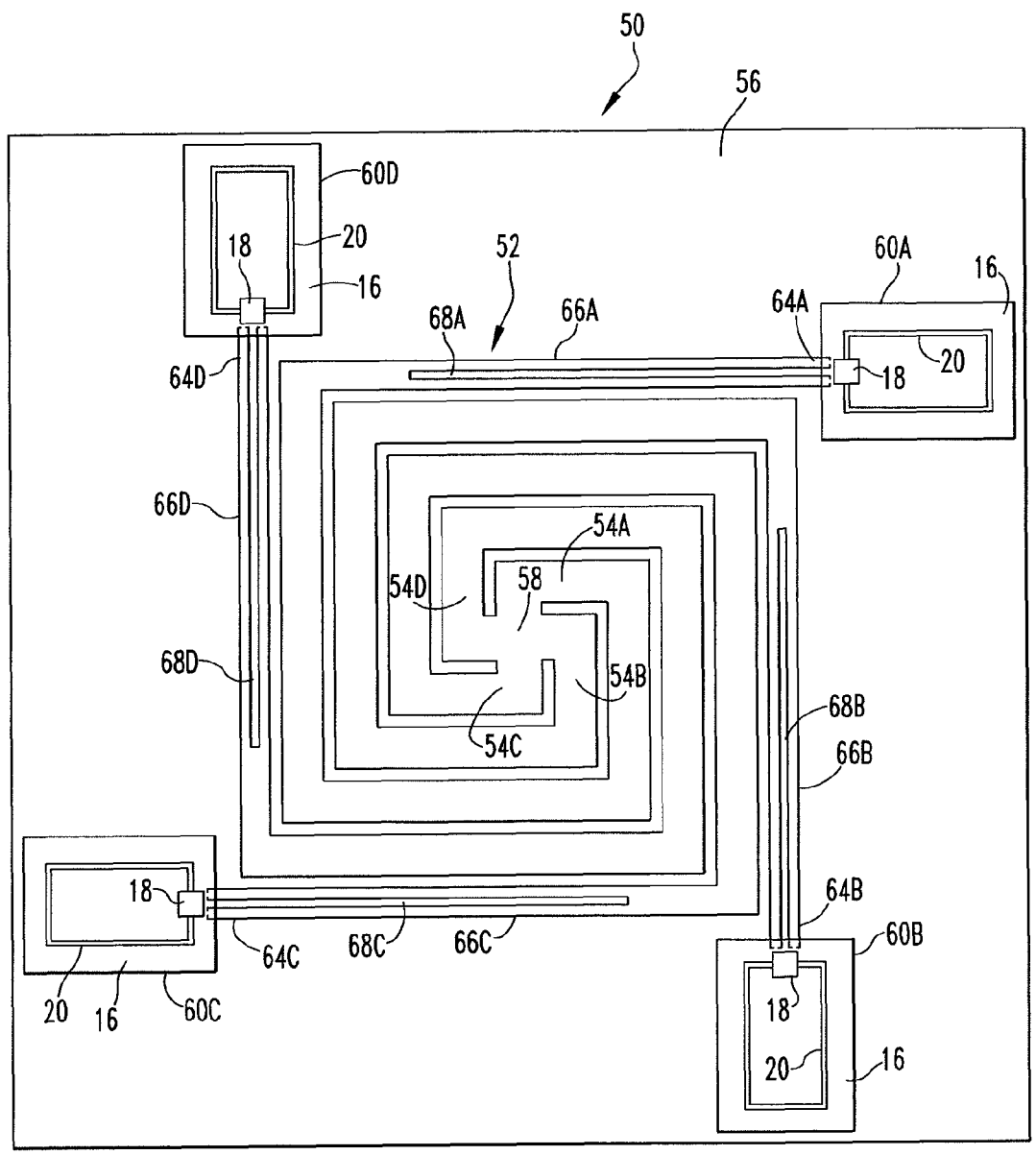
FIG. 15 is a schematic diagram of a transponder apparatus according to a further embodiment of the present invention.

FIG. 15 is a schematic diagram of a transponder apparatus 50 according to a further embodiment that employs capacitive coupling with inductive tuning as described below. The transponder apparatus 50 includes a main antenna element 52 provided on a substrate 56. The main antenna element 52 includes four conductor elements 54A, 54B, 54C, and 54D, which, in the embodiment shown, each have a square spiral shape such that they are nested within one another. As seen in FIG. 15, the conductor elements 54A, 54B, 54C, and 54D are each direct connection (DC) coupled to one another at a direct connection (DC) coupling point 58. In addition, a looped conductor device 60 (identified as 60A, 60B, 60C, 60D), each identical in structure to the near field device 12 shown in FIG. 2, is provided on the substrate 56 in the vicinity of the terminal end 64A, 64B, 64C, 64D of a terminal segment 66A, 66B, 66C, 66D of a respective conductor element 54A, 54B, 54C, 54D. The IC chip 18 of each looped conductor device 60A, 60B, 60C, 60D is not, in the embodiment shown, directly connected to the associated conductor element 54A, 54B, 54C, 54D (there is an air gap between IC chip 18 of each looped conductor device 60A, 60B, 60C, 60D and the associated conductor element 54A, 54B, 54C, 54D). Instead, each IC chip 18 is coupled to the associated conductor element 54A, 54B, 54C, 54D through capacitive coupling between the looped conductor 20 of the associated looped conductor device 60A, 60B, 60C, 60D and the associated conductor element 54A, 54B, 54C, 54D. In other words, each looped conductor 20 is capacitively coupled to a respective conductor element 54A, 54B, 54C, 54D (by being in the capacitive field thereof, which may or may not overlap the near field), and as a result, each IC chip 18 is coupled to a respective conductor element 54A, 54B, 54C, 54D so that energy and signals can be transferred from the conductor element 54A, 54B, 54C, 54D to the associated IC chip 18. In particular, the two points at which the looped conductor 20 is connected to the IC chip have a capacitive connection to the associated conductor element 54A, 54B, 54C, 54D at two points where the associated conductor element 54A, 54B, 54C, 54D has been slit to provide an inductive matching slot in the conductor (an inductive matching circuit) to balance out the capacitive connection. Such a configuration allows energy and signals (e.g., data and/or power signals) received by the main antenna element 52 from, for example, a base station such as the base station 4 (e.g., an RFID reader), to be transferred to the looped conductor devices 60A, 60B, 60C, 60D (i.e., to the IC chips 18 thereof). In addition, the direct connection between each of the conductor elements 54A, 54B, 54C, and 54D enables looped conductor devices 60A, 60B, 60C, 60D to be able to communicate with one another.

The capacitive coupling just described introduces a number of new capacitances into the transponder apparatus 50 and as a result will alter the resonance properties of the main antenna element 52. Thus, in order to balance/counteract this effect, each conductor element 54A, 54B, 54C, 54D is provided with a respective slot 68A, 68B, 68C, 68D therein. Preferably, the slot 68A, 68B, 68C, 68D is provided in the terminal segment 66A, 66B, 66C, 66D of the associated conductor element 54A, 54B, 54C, 54D beginning in the vicinity of the terminal end 64A, 64B, 64C, 64D thereof. Each slot 68A, 68B, 68C, 68D will introduce an inductive reactance that balances/counteracts the resonance change to a desired extent and which maintains a desired impedance matching between the IC chip 18 and the associated conductor element 54A, 54B, 54C, 54D. The dimensions of each slot 68A, 68B, 68C, 68D will be determined by the desired added inductive reactance, which in turn will be determined by the amount of capacitance added by the capacitive coupling described above. As a result, the transponder apparatus 50 can be said to include capacitive coupling with inductive tuning.

Figure 16:
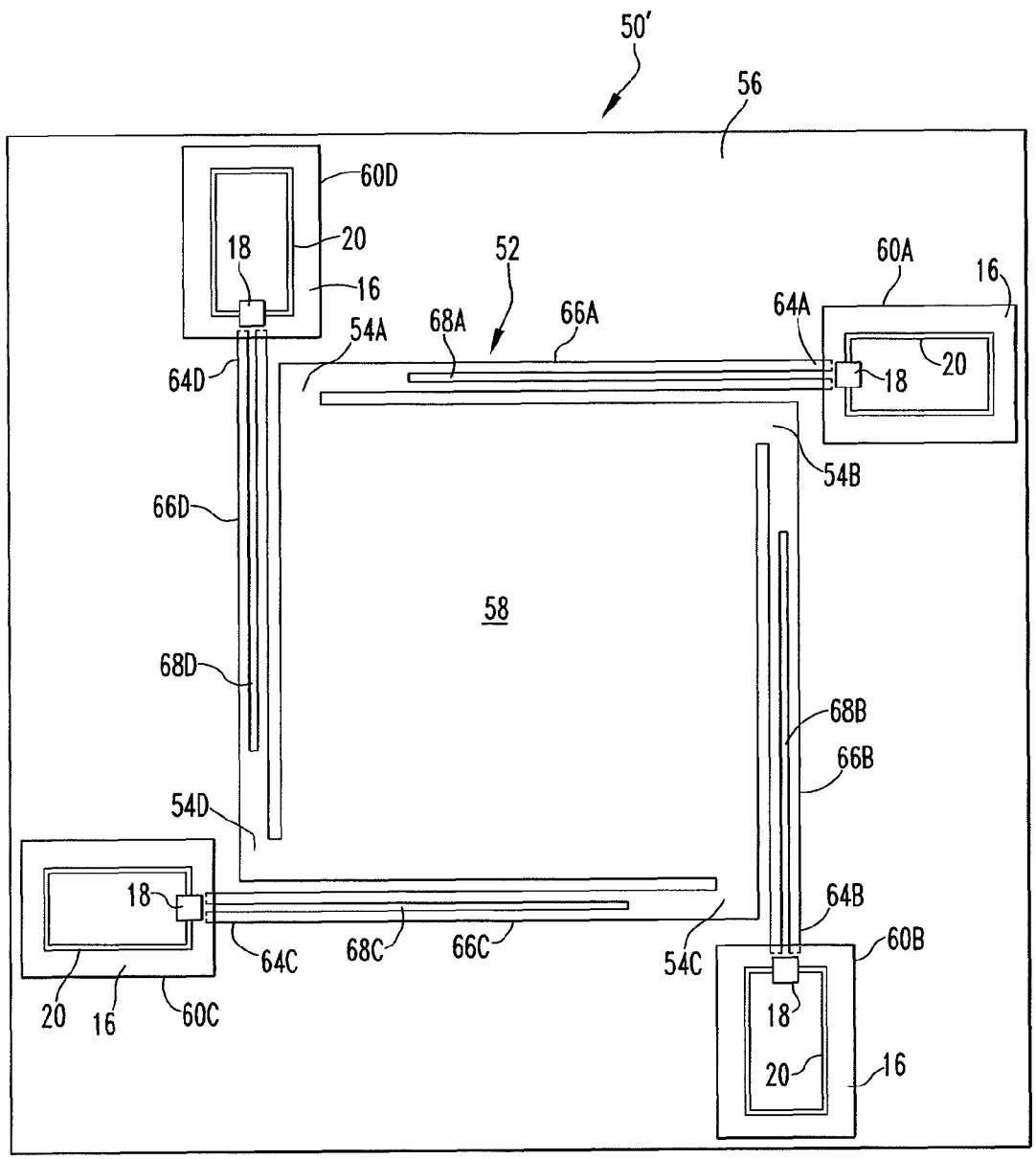
FIG. 16 is a schematic diagram of a transponder apparatus according to an alternate embodiment.

FIG. 16 is a schematic diagram of a transponder apparatus 50' according to an alternate embodiment, which is similar to the transponder apparatus 50. However, in the transponder apparatus 50', the size of the DC coupling point 58 has been increased to an extent that the main antenna element 52 largely comprises a patch antenna.

Figure 17:
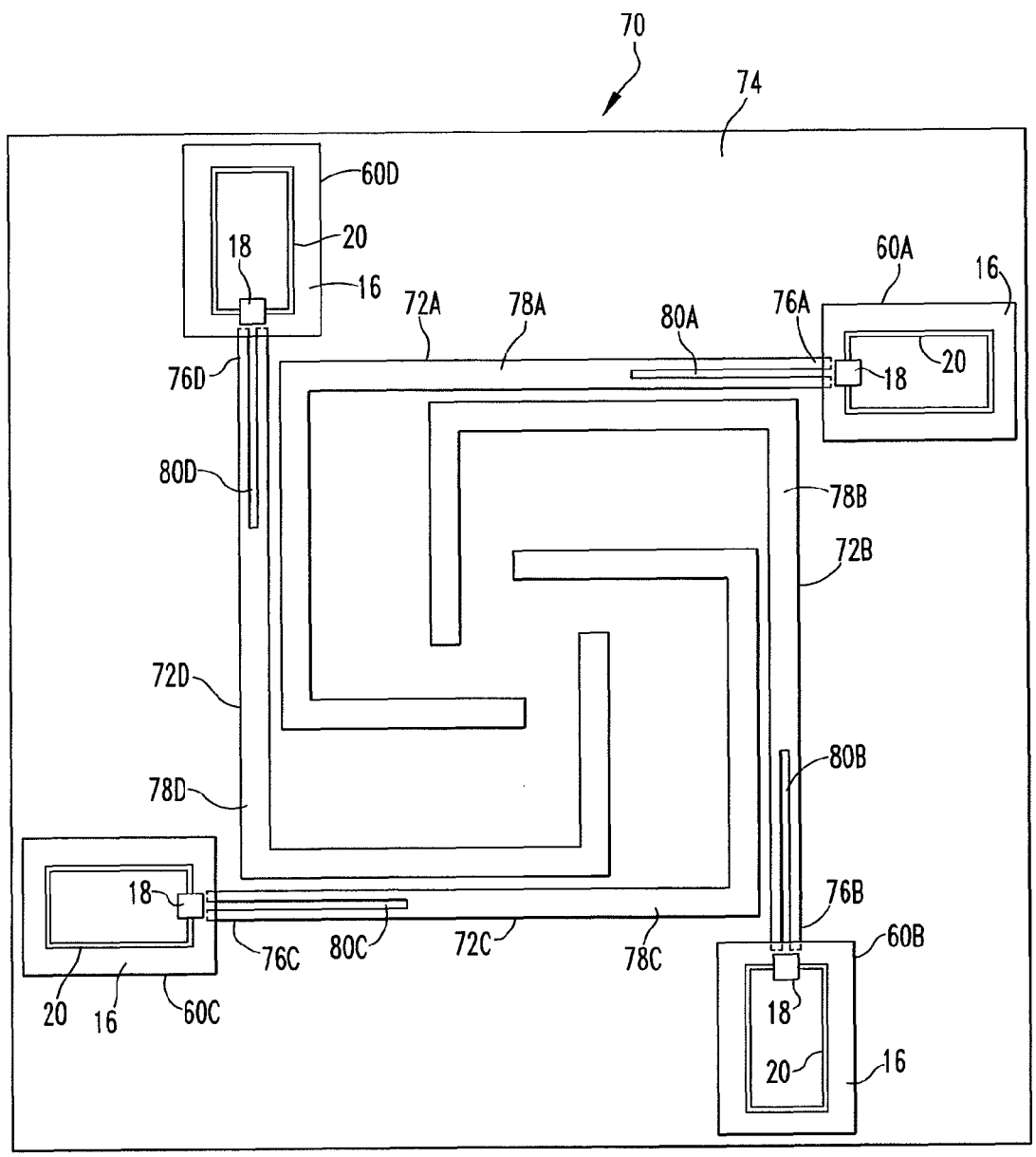
FIGS. 17-20 are schematic diagrams of a transponder apparatus according to further alternate embodiments.

FIG. 17 is a schematic diagram of a transponder apparatus 70 according to yet a further embodiment. The transponder apparatus 70 includes four separate antenna elements 72A, 72B, 72C, and 72D provided on a substrate 74 which are not connected to one another. In the embodiment shown, each of the antenna elements 72A, 72B, 72C, and 72D has a square spiral shape such that they are nested within one another. It should be understood that this is exemplary only, and that all of the antenna elements 72A, 72B, 72C and 72D may have a common different shape, or that the shapes may differ among the group of antenna elements 72A, 72B, 72C and 72D. As seen in FIG. 17, a looped conductor device 60 (identified as 60A, 60B, 60C, 60D), each identical in structure to the near field device 12 shown in FIG. 2, is provided on the substrate 74 in the vicinity of the terminal end 76A, 76B, 76C, 76D of a terminal segment 78A, 78B, 78C, 78D of a respective antenna element 72A, 72B, 72C, and 72D. The IC chip 18 of each looped conductor device 60A, 60B, 60C, 60D is not, in the embodiment shown, directly connected to the associated antenna element 72A, 72B, 72C, and 72D. Instead, each IC chip 18 is coupled to the associated antenna element 72A, 72B, 72C, and 72D through capacitive coupling between the looped conductor 20 of the associated looped conductor device 60A, 60B, 60C, 60D and the associated antenna element 72A, 72B, 72C, and 72D. In other words, each looped conductor 20 is capacitively coupled to a respective antenna element 72A, 72B, 72C, and 72D, and as a result, each IC chip 18 is coupled to a respective antenna element 72A, 72B, 72C, and 72D so that energy and signals (e.g., data and/or power signals) can be transferred from the antenna element 72A, 72B, 72C, and 72D to the associated IC chip 18. Such a configuration allows energy and signals received by each respective antenna element 72A, 72B, 72C, and 72D from, for example, a base station such as the base station 4 (e.g., an RFID reader), to be transferred to the associated looped conductor device 60A, 60B, 60C, 60D (i.e., the IC chip 18 thereof).

As described elsewhere herein, the capacitive coupling just described will alter the resonance properties of each antenna element 72A, 72B, 72C, and 72D. Thus, in order to balance/counteract this effect, each antenna element 72A, 72B, 72C, and 72D is provided with a respective slot 80A, 80B, 80C, 80D therein. Preferably, the slot 80A, 80B, 80C, 80D is provided in the terminal segment 78A, 78B, 78C, 78D of the associated antenna element 72A, 72B, 72C, and 72D beginning at the terminal end 76A, 76B, 76C, 76D thereof. Each slot 80A, 80B, 80C, 80D will introduce an inductive reactance that balances/counteracts the resonance change to a desired extent. The dimensions of each slot 80A, 80B, 80C, 80D will be determined by the desired added inductive reactance, which in turn will be determined by the amount of capacitance added by the capacitive coupling described above. As a result, the transponder apparatus 70 can be said to include capacitive coupling with inductive tuning.

Figure 18:
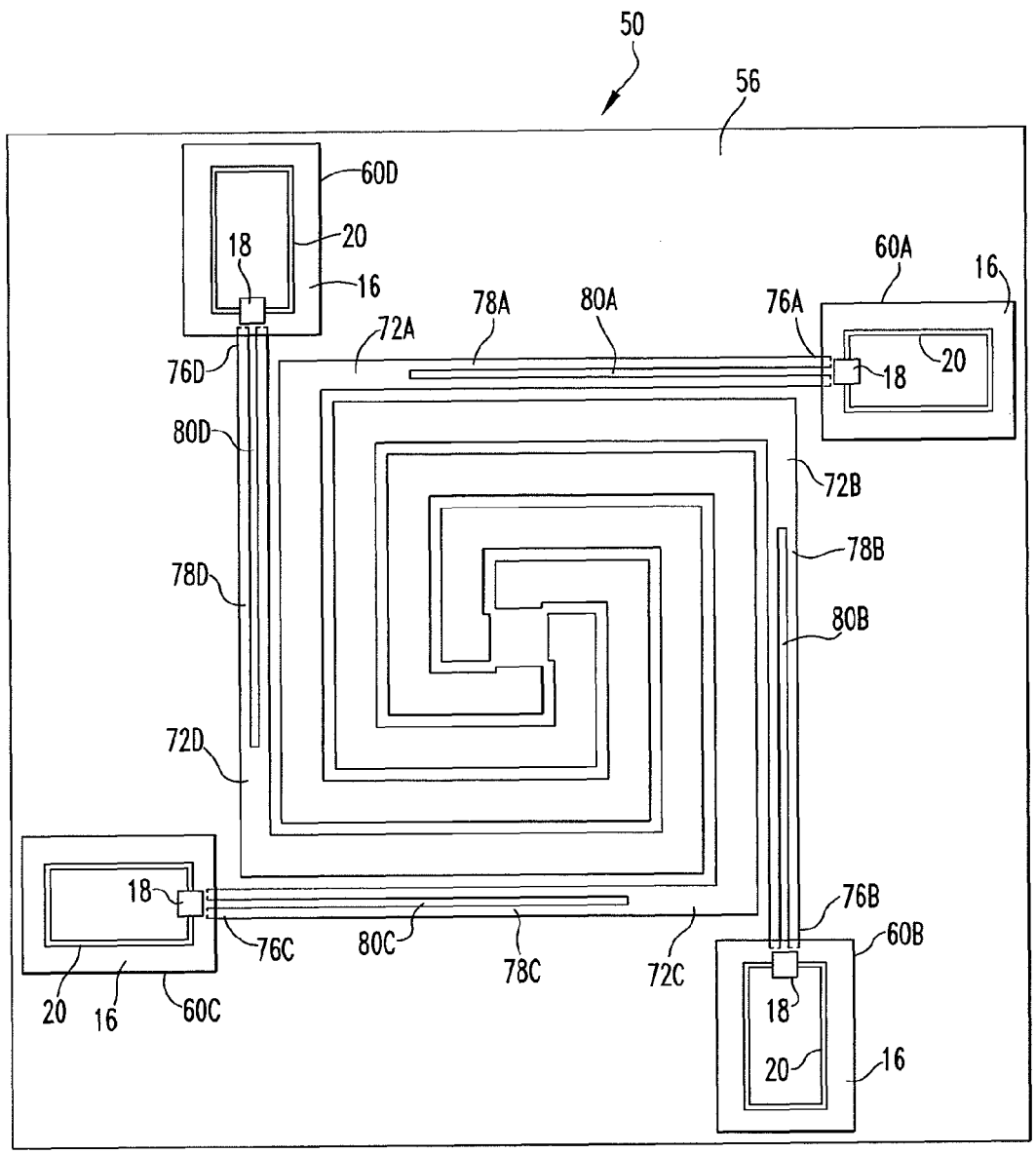
Figure 19:
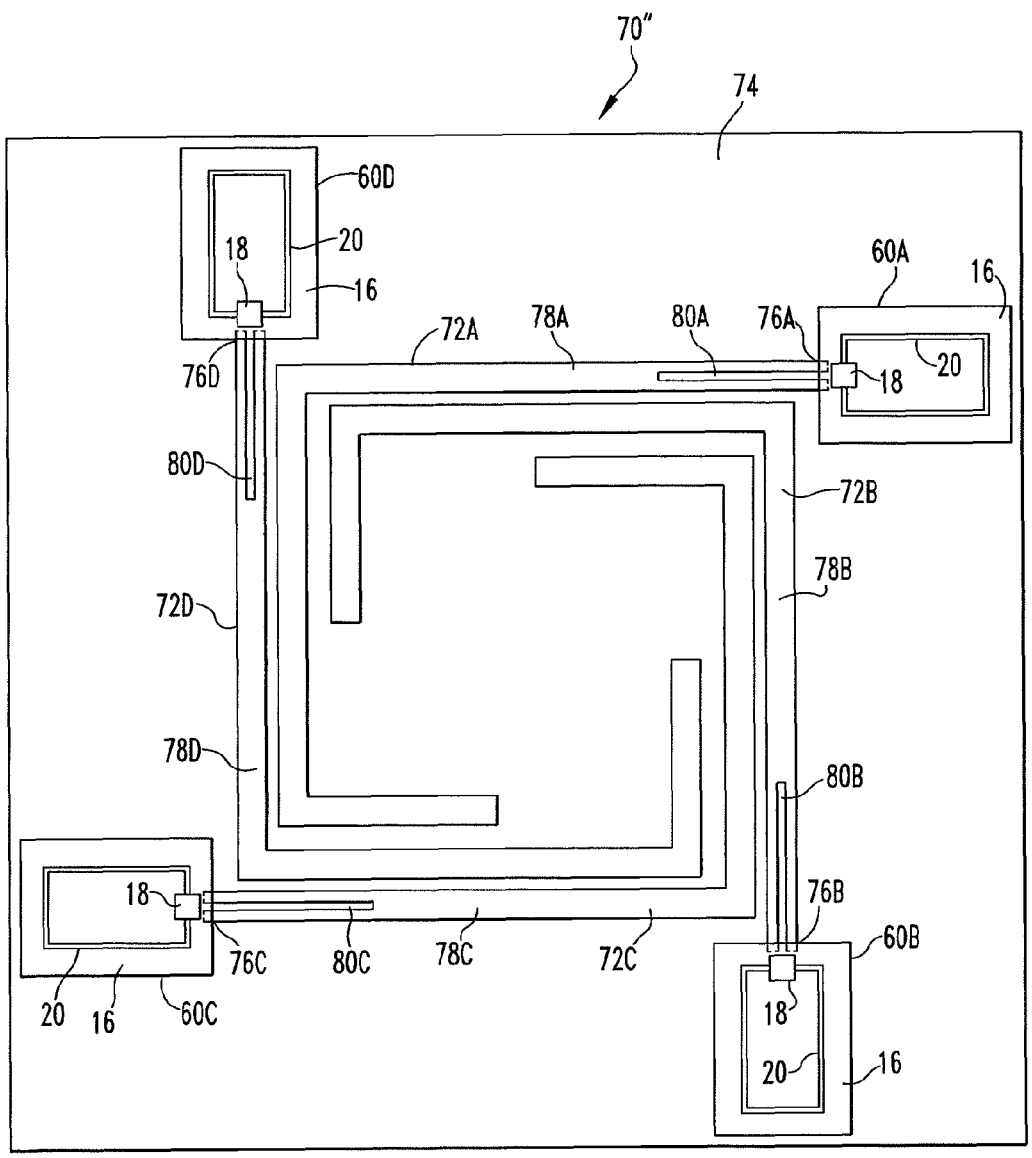
Figure 20:
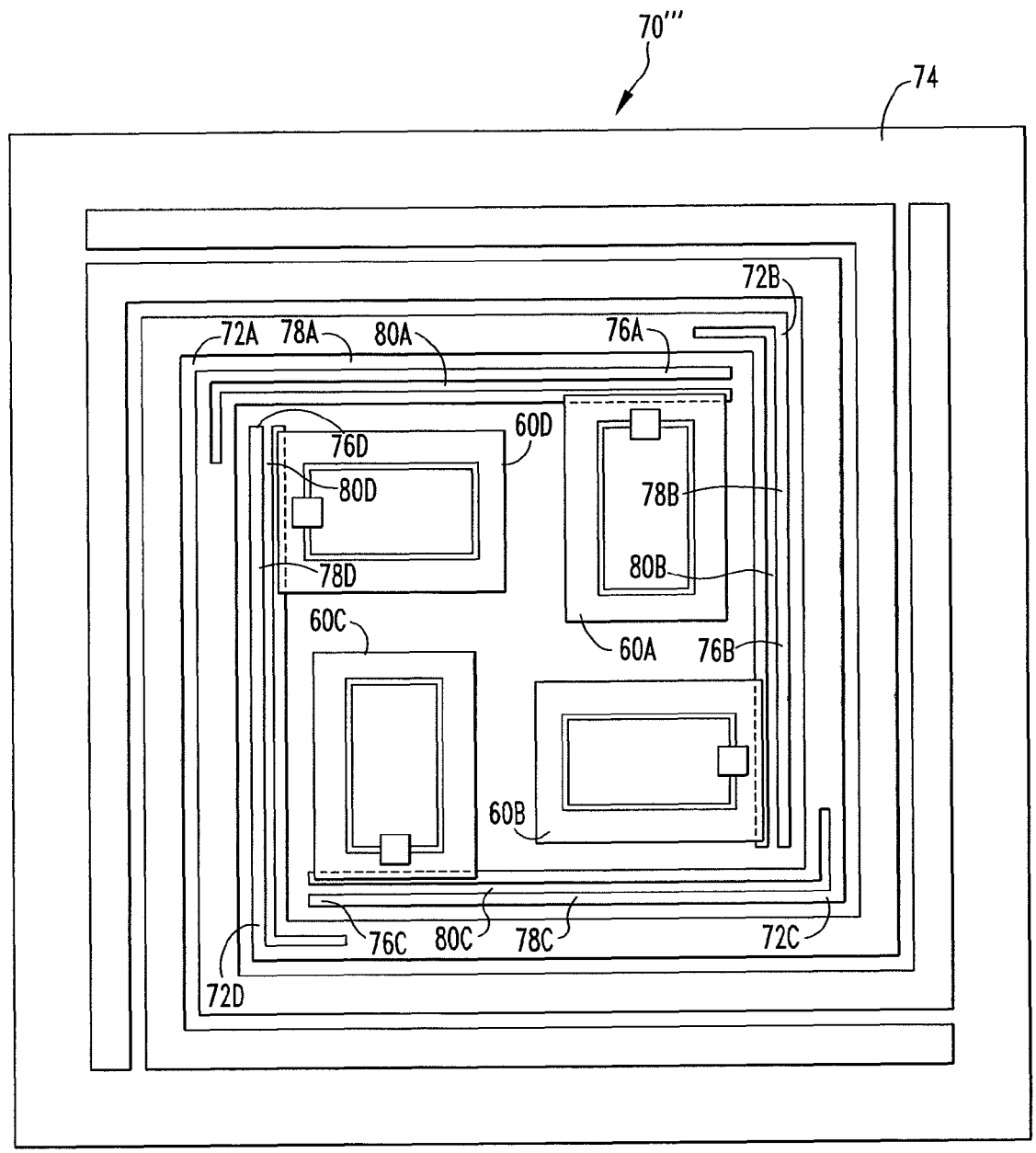

FIGS. 18 and 19 are schematic diagrams of a transponder apparatuses 70' and 70'' according to alternative further embodiments wherein the spacing between the antenna elements 72A, 72B, 72C, and 72D has been altered. FIG. 20 is a schematic diagram of a transponder apparatus 70''' according to still a further alternative embodiments wherein the looped conductor devices 60A, 60B, 60C, 60D, the terminal segment 78A, 78B, 78C, 78D and the slots 80A, 80B, 80C, 80D are positioned in the central region of the transponder apparatus 70''' (wherein they are surrounded by the remainder of the antenna elements 72A, 72B, 72C, and 72D) as opposed to the outer periphery thereof.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A transponder apparatus, comprising:
a main antenna element having a plurality of conductor elements, each of the conductor elements having a first end and a terminal end located opposite the first end along a length of the conductor element, wherein the first ends of each of said conductor elements are direct connection coupled to one another, and wherein the terminal end of each of the conductor elements is not directly attached to any other ones of the conductor elements; and
a plurality of devices;
wherein each of said devices includes an IC chip operatively coupled to a conductor, wherein each of said devices is positioned adjacent to the terminal end of a respective one of said conductor elements, wherein the conductor of each of said devices is capacitively coupled to the one of said conductor elements adjacent to which the device is positioned, wherein the conductor and the IC chip of each of said devices is not physically connected to the one of said conductor elements adjacent to which the device is positioned, wherein each of said conductor elements has a slot provided therein which provides an inductive reactance, and wherein the slot provided in each of said conductor elements begins adjacent to and extends all the way to the terminal end of the conductor element such that the terminal end comprises two separated conductor portions comprising two separate coupling points capacitively coupled to the conductor of the device that is positioned adjacent to the conductor element.

2. The transponder apparatus according to claim 1, wherein each of said devices is a looped conductor device and wherein the conductor of each of said devices is a looped conductor.

3. The transponder apparatus according to claim 1, wherein each of said conductor elements is direct connection coupled to one another at a central DC coupling point.

4. A transponder apparatus, comprising:
a main antenna element having a plurality of conductor elements, each of said conductor elements being direct connection coupled to one another at a central DC coupling point comprising a patch antenna; and
a plurality of devices;
wherein each of said devices includes an IC chip operatively coupled to a conductor, wherein each of said devices is positioned adjacent to a terminal end of a respective one of said conductor elements, wherein the conductor of each of said devices is capacitively coupled to the one of said conductor elements adjacent to which the device is positioned, wherein the conductor and the IC chip of each of said devices is not physically connected to the one of said conductor elements adjacent to which the device is positioned, and wherein each of said conductor elements has a slot provided therein which provides an inductive.

5. The transponder apparatus according to claim 1, wherein the IC chip of each of said devices receives AC energy from the conductor element adjacent to which it is positioned through the conductor of the device and converts said AC energy into a DC voltage.

6. The transponder apparatus according to claim 1, wherein the IC chip of each of said devices receives power and communications through the capacitive coupling to the one of said conductor elements adjacent to which the device is positioned.

7. The transponder apparatus according to claim 1, wherein each of said conductor elements has a similar shape.

8. The transponder apparatus according to claim 7, wherein the similar shape is a square spiral shape.

9. The transponder apparatus according to claim 1, wherein said main antenna element is provided on a first substrate, wherein each of said devices includes a non-conductive substrate on which the IC chip and the conductor thereof are provided, and wherein each non-conductive substrate is positioned on top of said first substrate.

10. The transponder apparatus according to claim 1, wherein the inductive reactance provided by each slot is selected to maintain a matching between the associated conductor element and the associated IC chip and to balance a capacitance provided by the associated capacitive coupling.

11. A transponder apparatus, comprising:
a substrate;
a plurality of separate antenna elements provided on the substrate and not direct connection coupled to one another, each of the antenna elements having a first end and a terminal end located opposite the first end along a length of the antenna element, wherein in each of the antenna elements the first end is not directly attached to the terminal end; and
a plurality of devices;
wherein each of said devices includes an IC chip operatively coupled to a conductor, wherein each of said devices is positioned adjacent to the terminal end of a respective one of said antenna elements, wherein the conductor of each of said devices is capacitively coupled to the terminal end of the one of said antenna elements adjacent to which the device is positioned and is not coupled to any other ones of said antenna elements, wherein the conductor and the IC chip of each of said devices is not physically connected to the one of said antenna elements adjacent to which the device is positioned, and wherein each of said conductor elements has a slot provided therein which provides an inductive reactance.

12. The transponder apparatus according to claim 11, wherein each of said devices is a looped conductor device and wherein the conductor of each of said devices is a looped conductor.

13. The transponder apparatus according to claim 11, wherein the slot provided in each of said antenna elements begins adjacent to and extends all the way to the terminal end of the antenna element such that the terminal end comprises two separated conductor portions comprising two separate coupling points capacitively coupled to the conductor of the device that is positioned adjacent to the antenna element.

14. The transponder apparatus according to claim 11, wherein the IC chip of each of said devices receives AC energy from the antenna element adjacent to which it is positioned through the conductor of the device and converts said AC energy into a DC voltage.

15. The transponder apparatus according to claim 11, wherein the IC chip of each of said devices receives power and communications through the capacitive coupling to the one of said antenna elements adjacent to which the device is positioned.

16. The transponder apparatus according to claim 11, wherein each of said antenna elements has a similar shape.

17. The transponder apparatus according to claim 16, wherein the similar shape is a square spiral shape.

18. The transponder apparatus according to claim 11, wherein said antenna elements are provided on a first substrate, wherein each of said devices includes a non-conductive substrate on which the IC chip and the conductor thereof are provided, and wherein each non-conductive substrate is positioned on top of said first substrate.

19. The transponder apparatus according to claim 11, wherein said devices are each positioned in a central portion of said transponder apparatus and are surrounded by said antenna elements.

20. The transponder apparatus according to claim 19, wherein each of said antenna elements has a square spiral shape.

21. The transponder apparatus according to claim 11, wherein the conductor of each of said devices is capacitively coupled to the one of said antenna elements adjacent to which the device is positioned at two points located on opposite sides of the slot of the one of said antenna elements.

22. The transponder apparatus according to claim 11, wherein the inductive reactance provided by each slot is selected to maintain a matching between the associated antenna element and the associated IC chip and to balance a capacitance provided by the associated capacitive coupling.

* * * * *

UNITED STATES PATENT AND TRADEMARK OFFICE
CERTIFICATE OF CORRECTION

PATENT NO. : 8,461,993 B2  
APPLICATION NO. : 12/181753  
DATED : June 11, 2013  
INVENTOR(S) : Marlin H. Mickle et al.

Page 1 of 1

It is certified that error appears in the above-identified patent and that said Letters Patent is hereby corrected as shown below:

Title page, second column, item (74) Attorney, Agent, or Firm, second line, "Phillip E. Levy" should read --Philip E. Levy--.

In the Specification  
Column 1, line 12, "are" should read --is--.  
Column 1, line 16, "relates wireless" should read --relates to wireless--.  
Column 2, line 9, "may provided" should read --may be provided--.  
Column 2, line 12, "provided" should read --be provided--.  
Column 2, line 16, "mat" should read --may--.  
Column 2, line 34, "nether" should read --neither--.  
Column 2, line 55, "being direct connection" should read --being in direct connection--.  
Column 6, line 42, "remove-" should read --remov- --.  
Column 6, line 44, "peel-able" should read --peelable--.  
Column 7, line 19, "removeably" should read --removably--.  
Column 7, line 39, "removeably" should read --removably--.  
Column 7, line 41, "removeably" should read --removably--.  
Column 7, line 43, "removeably" should read --removably--.  
Column 8, line 59, "each direct" should read --each in direct--.  
Column 10, line 47, "of a transponder" should read --of transponder--.  
Column 10, line 52, "embodiments" should read --embodiment--.

Signed and Sealed this  
Thirteenth Day of May, 2014

Michelle K. Lee  
*Deputy Director of the United States Patent and Trademark Office*